US012334069B2

(12) United States Patent
Khanna et al.

(10) Patent No.: US 12,334,069 B2
(45) Date of Patent: Jun. 17, 2025

(54) AUTOMATED ASSISTANT THAT UTILIZES RADAR DATA TO DETERMINE USER PRESENCE AND VIRTUALLY SEGMENT AN ENVIRONMENT

(71) Applicant: GOOGLE LLC, Mountain View, CA (US)

(72) Inventors: Varn Khanna, Vallejo, CA (US); Chintan Trehan, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 229 days.

(21) Appl. No.: 17/964,448

(22) Filed: Oct. 12, 2022

(65) Prior Publication Data

US 2024/0127808 A1    Apr. 18, 2024

(51) Int. Cl.
*G10L 15/22* (2006.01)

(52) U.S. Cl.
CPC .................................. *G10L 15/22* (2013.01)

(58) Field of Classification Search
None
See application file for complete search history.

(56) References Cited

U.S. PATENT DOCUMENTS

| 10,083,006 | B1 * | 9/2018 | Feuz | G10L 25/51 |
| 10,452,116 | B1 | 10/2019 | Devries et al. | |
| 10,657,951 | B2 | 5/2020 | Guo | |
| 2018/0293221 | A1 | 10/2018 | Finkelstein et al. | |
| 2021/0345040 | A1 | 11/2021 | Meyer et al. | |
| 2021/0392395 | A1 | 12/2021 | Jobanputra et al. | |
| 2023/0197073 | A1 * | 6/2023 | Jang | B25J 11/0005 704/275 |

OTHER PUBLICATIONS

European Patent Office; International Search Report and Written Opinion issued in Application No. PCT/US2023/034382; 11 pages; dated Mar. 5, 2024.
Singh et al., "I Always Feel Like Somebody's Sensing Me! A Framework to Detect, Identify, and Localize Clandestine Wireless Sensors" University of California, Los Angeles, 18 pages, Oct. 12, 2022.

* cited by examiner

*Primary Examiner* — Quynh H Nguyen
(74) *Attorney, Agent, or Firm* — Gray Ice Higdon (57) ABSTRACT

Implementations relate to an automated assistant that can determine whether to respond to inputs in an environment according to whether radar data indicates a user is present. When user presence is detected, the automated assistant can virtually segment the environment and apply certain operational parameters to certain segments of the environment. For instance, the automated assistant can enable an input detection feature, such as warm word detection, for a segmented portion of the environment in which a user is detected. In this way, false positives can be mitigated for instances in which environmental and/or user sounds are detected by the automated assistant but do not originate from a particular segment of the environment. Other parameters, such as varying confidence thresholds and/or speech processing biasing, can be temporarily enforced for different segments of an environment in which a user is detected.

13 Claims, 5 Drawing Sheets

AUTOMATED ASSISTANT THAT UTILIZES RADAR DATA TO DETERMINE USER PRESENCE AND VIRTUALLY SEGMENT AN ENVIRONMENT

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input.

In some instances, automated assistants may operate to determine whether a user has provided a "wake" word and/or other word or phrase to invoke the automated assistant. A wake word can be a word or phrase that, when detected, causes the automated assistant to be temporarily invoked in furtherance of detecting a subsequent command from a user. Other such invocation phrases can include "warm" words or "hot" words, which can include one or more words that invoke the automated assistant to perform certain actions in certain contexts, such as when the word "stop" is detected while an alarm is going off. Implementing such features for an automated assistant can often result in false positives being detected when an invocation phrase is incorrectly identified in audio data. For example, in certain circumstances, the automated assistant can be inadvertently responsive to environmental sounds such as weather, nearby traffic, and/or sounds from non-assistant devices. As a result, processing bandwidth and power can be consumed responding to seemingly inconsequential sounds and other vibrations.

SUMMARY

Implementations set forth herein relate to an automated assistant that is accessible via a computing device that includes a radar device for detecting a presence of one or more users, with prior permission from the users. The radar device can provide transmitted data to an environment of an assistant-enabled device and capture received data that is reflected from the environment. Differences between the transmitted data and the received data can be utilized to determine whether one or more users are present in the environment. When a user is determined to be in the environment, and/or within a threshold distance from the assistant-enabled device, a confidence threshold for detecting one or more invocation phrases can be adjusted. For example, prior to a forthcoming invocation phrase being detected, radar data can be processed for determining that a user is present within a threshold distance of a computing device. In response, an input detection feature of the automated assistant can be activated. Alternatively, or additionally, the confidence threshold can be adjusted such that a lower probability, for a detected input, generated by the automated assistant can satisfy the confidence threshold. In these and other manners, instances of false positives (e.g., invocation of an assistant based when such invocation was not intended by a corresponding user) can be mitigated, and/or assistant invocation can be performed more readily in the presence of a user (i.e., occurrences of false negatives mitigated), according to radar data generated by an assistant-enabled device.

In some implementations, data characterizing the environment can be segmented to represent segmented portions of the environment, and entries stored in association with the data can correlate certain assistant parameters to certain segments. For example, when radar data indicates that a user is present in the environment of an assistant-enabled device, segment data can be generated to identify the segment (e.g., an area that is less than an entire area of the environment) of the environment that the user is present in and/or the segment in which an input detection feature should be active. As a result, other audio detected from other segments of the environment may not be processed according to a particular input detection feature (e.g., warm word detection), thereby preserving resources of any affected assistant-enabled device. Alternatively, or additionally, the segment data can be stored in association with a modified confidence threshold for the segment, thereby allowing any further probabilities for inputs originating from the segment to be compared to the modified confidence threshold. In some instances, input detection features may be active for other segments, but confidence thresholds for those other segments of the environment can remain unmodified (e.g., at a default setting) until a user is detected within one of the other segments. For example, a spoken utterance originating from a segment where a user has been detected may be more likely to satisfy the confidence threshold compared to if the same, or phonetically similar, spoken utterance originated from another segment in which a user has not been detected (e.g., has not been detected for at least a threshold duration of time).

In some implementations, the segment data can include entries that correlate a segment of an environment to a certain subject matter that a user has provided, or is estimated to provide, while located in the segment of the environment. Alternatively, or additionally, entries of the segment data can correlate confidence thresholds for certain subject matter to the segment of the environment. For example, when a user is located in a particular segment of the environment and requests the automated assistant to provide information about nearby restaurants, an entry can be generated and/or updated to provide a correlation between restaurant-related words and the particular segment. Alternatively, or additionally, the entry can be generated and/or updated such that a particular confidence metric for restaurant-related words creates a bias for processing spoken utterances, originating from the particular segment, towards the restaurant-related words.

As an example, when radar data indicates that no users are home during a majority of a day, a confidence threshold can be set to a value that may be suitable for preserving computational resources and/or power of a computing device. Later in the day, the radar data can indicate that multiple users are present within a segment of an environment of the computing device. In response, the automated assistant can cause a confidence threshold for detecting an invocation phrase to be modified such that a lower probability metric, determined for a spoken utterance, can invoke a response from the automated assistant. In some implementations, a subject matter of the spoken utterance can be determined and be utilized to determine a particular confidence metric to bias speech processing towards that subject matter, when a subsequent spoken utterance is received from that segment of the environment.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
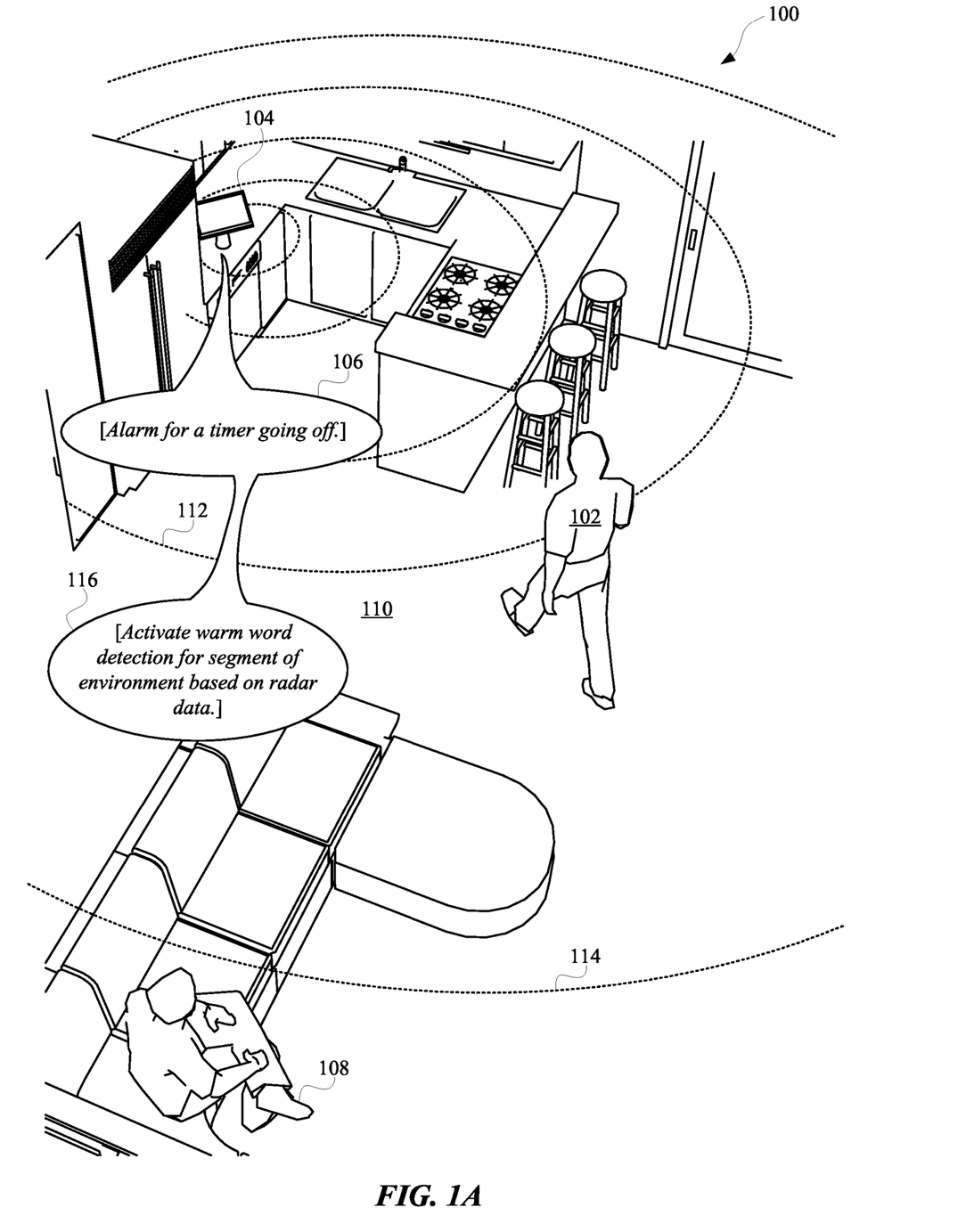
FIG. 1A and FIG. 1B illustrate views of a user interacting with a computing device that provides access to an automated assistant that uses radar to determine whether to respond to inputs detected from different segments of an environment.
Figure 1B:
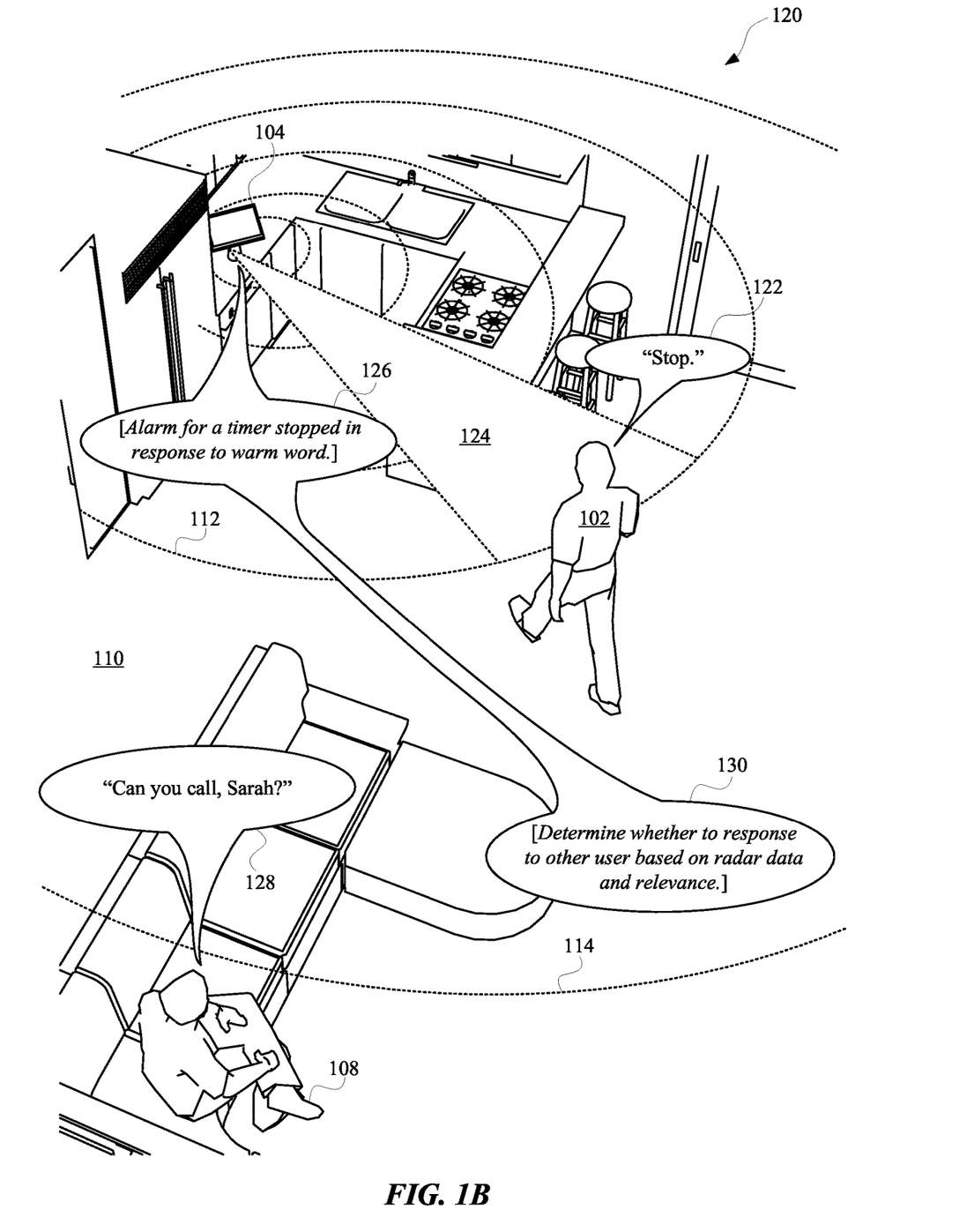

FIG. 1A and FIG. 1B illustrate a view 100 and a view 120 of a user 102 interacting with a computing device 104 that provides access to an automated assistant that uses radar to determine whether to respond to inputs detected from different segments of an environment. For example, the user 102 can be in an environment 110 that includes the computing device 104, which can include one or more radar devices for determining whether any users are present within a threshold distance 114 of the computing device 104. The radar device can provide transmitted data to the environment 110 and receive, based on a reflection of a transmission from the environment, reflected data. Differences between the transmitted data and the reflected data can be utilized, with prior permission from the user 102, to determine whether a user is present in the environment and/or whether a user is present within a threshold distance 114 of an assistant-enabled device. Based on this determination, the automated assistant can operate to activate certain input detection features and/or modify a setting of an input detection feature in furtherance of providing more efficient user interactions and/or mitigating false positives that can occur when detecting user inputs.

For example, when a transmission 112 from the radar device is reflected, and reflected data is processed, the automated assistant can activate, or allow to remain inactive, an input detection feature of the automated assistant, such as warm word detection. This activation operation 116 can be performed, for example, near a time when an alarm operation 106 is executing to cause an alarm to go off in the environment 110. Therefore, in response to the user 102 being detected in an environment 110 of the computing device 104, the automated assistant can transition from having the warm word detection de-activated to the warm word detection activated. As a result, the user 102 can provide a warm word 122, such as "Stop," to cause another alarm operation 126 to initialize for ceasing the output of the timer alarm.

In some implementations, detection of a user 102 within a threshold distance of the computing device 104 can cause the automated assistant to modify a confidence threshold for detecting inputs from the user 102. For example, when the radar data does not indicate that a user is present in the environment 110, warm word detection can be active, but the confidence threshold for detecting a warm word can be higher and/or otherwise more stringent. However, when the radar data indicates that the user is present in the environment 110, the confidence threshold for warm word detection can be relatively lower and/or other less stringent. As a result, a responsiveness of the automated assistant to warm words can be improved while also mitigating opportunities of false positives occurring when persons are talking but are not within a threshold distance from the computing device 104.

In some implementations, when the radar data indicates that a user 102 is present within an environment 110, the automated assistant can determine a particular segment 124 of the environment 110 that the user 102 is located in. When the segment 124 is identified, the automated assistant can at least temporarily operate certain assistant features based on the determination that the user 102 or another user is located in the segment 124 of the environment 110. For example, in some implementations, audio data captured from the environment 110 can be processed to determine a location from which a user input originated. The audio data can be captured, for example, by an array of microphones of the computing device 104, thereby allowing the computing device to identify a particular direction from which audio originated. When a user input is detected from the segment 124 in which the user 102 was detected, the automated assistant can respond to the user input according to certain parameters. For example, a threshold degree of confidence for inputs originating from the segment 124 can be lower (i.e., less stringent) compared to another threshold degree of confidence for other inputs originating from other segmented portions of the environment 110.

Alternatively, or additionally, speech processing of user inputs from the segment 124 can be biased towards certain subject matter, based on the radar data indicating that the user 102 is within the segment 124 of the environment 110. For example, other data available to the computing device 104 and/or automated assistant can be processed, with prior permission from the user 102, to determine certain subject matter that the user 102 may have expressed interest in. For instance, when the user 102 is determined to have provided the automated assistant with a request to initialize the timer that is going off in FIG. 1A, spoken utterances originating from the segment 124 can be processed with a bias toward "timer" related subject matter. In some implementations, such biasing can be performed with natural language understanding processes when determining whether a particular portion of audio data corresponds to a particular word or phrase, and/or whether a particular word or phrase corresponds to a particular assistant action or operation. This can mitigate opportunities for false positives to occur when other users are chatting within the environment 110 but not addressing the automated assistant.

As an example, another user 108 that is outside of the segment 124 can be addressing the user 102 by providing a spoken utterance 128 such as, "Can you call, Sarah?" Because ASR may be operating to detect warm words provided by users in the environment 110, the automated assistant can perform an operation 130 to determine whether the word "Sarah" should be interpreted as the warm word "Start," which can relate to the timer that was going off. However, because the user 108 is outside of the segment 124, any audio data capturing the spoken utterance 128 may not be processed with a bias towards timer related terms. Alternatively, or additionally, because the user 108 is outside of the segment 124, any audio data capturing the spoken utterance 128 may not be biased towards any warm words (e.g., "Call," "Start," "Stop," etc.) that the automated assistant can otherwise respond to. In some implementations, this can be in part because the other user 108 is outside of a threshold distance from the computing device 104, as determined using the radar data and/or any other data available to the automated assistant with permission from the users. Alternatively, or additionally, this can be in part because the user 108 is not located within a segment of the environment that is biased towards certain warm words and, therefore, a confidence score determined for the spoken utterance 128 may not have satisfied a threshold degree of confidence for responding to audio originating from the location of the user 108.

Figure 2:
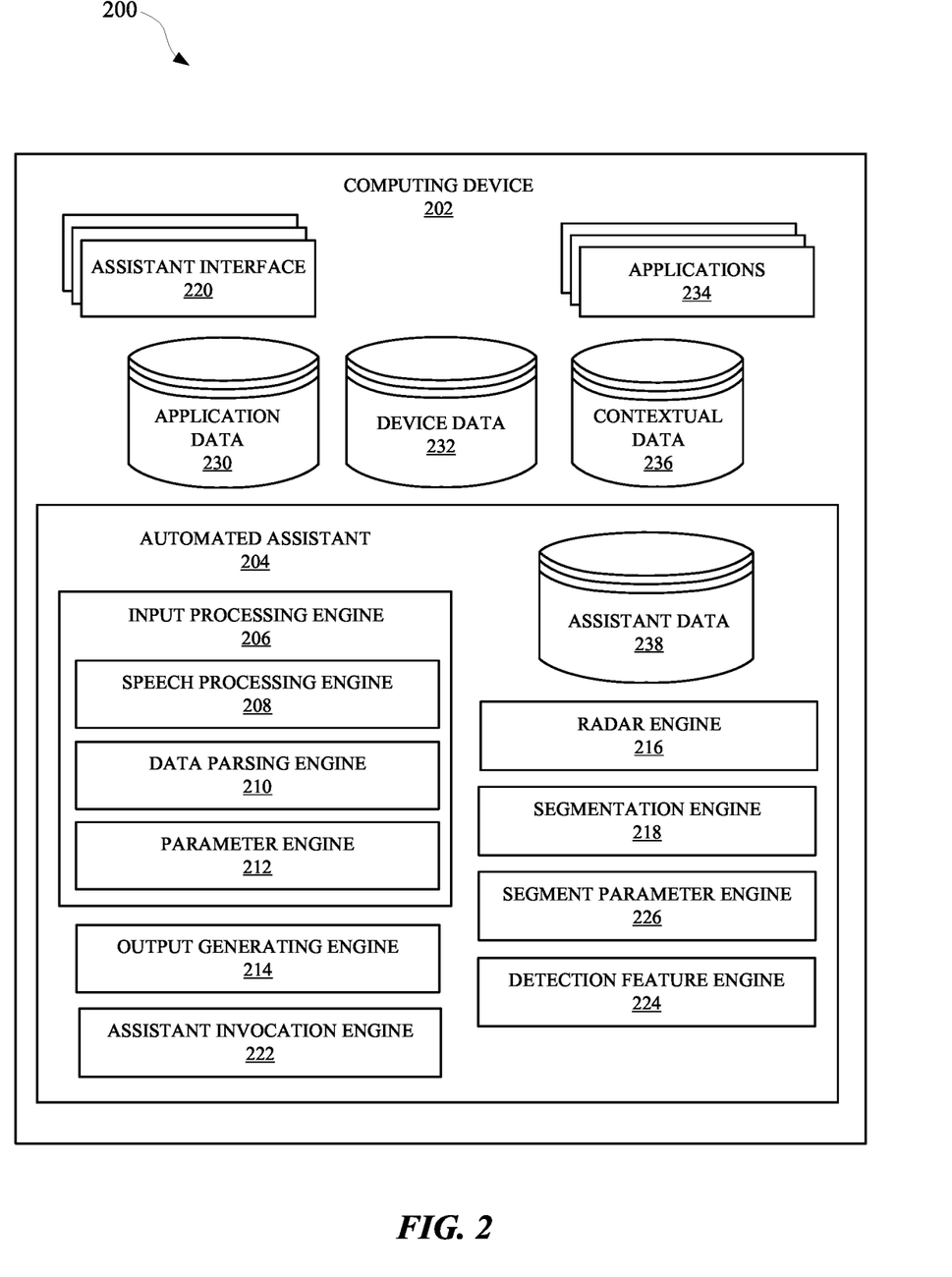
FIG. 2 illustrates a system for operating an automated assistant according to a radar device for detecting a presence of one or more users, with prior permission from the users.

FIG. 2 illustrates a system 200 for operating an automated assistant 204 according to a radar device for detecting a presence of one or more users, with prior permission from the users. The automated assistant 204 can operate as part of an assistant application that is provided at one or more computing devices, such as a computing device 202 and/or a server device. A user can interact with the automated assistant 204 via assistant interface(s) 220, which can be a microphone, a camera, a touch screen display, a user interface, and/or any other apparatus capable of providing an interface between a user and an application. For instance, a user can initialize the automated assistant 204 by providing a verbal, textual, and/or a graphical input to an assistant interface 220 to cause the automated assistant 204 to initialize one or more actions (e.g., provide data, control a peripheral device, access an agent, generate an input and/or an output, etc.). Alternatively, the automated assistant 204 can be initialized based on processing of contextual data 236 using one or more trained machine learning models. The contextual data 236 can characterize one or more features of an environment in which the automated assistant 204 is accessible, and/or one or more features of a user that is predicted to be intending to interact with the automated assistant 204. The computing device 202 can include a display device, which can be a display panel that includes a touch interface for receiving touch inputs and/or gestures for allowing a user to control applications 234 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors.

The computing device 202 and/or other third party client devices can be in communication with a server device over a network, such as the internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the text embodied in the audio data. The audio data can be transmitted from, for example, the computing device 202 to the server device in order to preserve computational resources at the computing device 202. Additionally, or alternatively, the audio data can be exclusively processed at the computing device 202.

The process for converting the audio data to text can include a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 238 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an assistant interface 220 for providing an output to a user, and/or communicate with one or more applications 234 for providing an output to one or more applications 234.

In some implementations, the automated assistant 204 can be an application that can be installed "on-top of" an operating system of the computing device 202 and/or can itself form part of (or the entirety of) the operating system of the computing device 202. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 202. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a third-party entity that is different from an entity that provided the computing device 202 and/or the automated assistant 204. An application state engine of the automated assistant 204 and/or the computing device 202 can access application data 230 to determine one or more actions capable of being performed by one or more applications 234, as well as a state of each application of the one or more applications 234 and/or a state of a respective device that is associated with the computing device 202. A device state engine of the automated assistant 204 and/or the computing device 202 can access device data 232 to determine one or more actions capable of being performed by the computing device 202 and/or one or more devices that are associated with the computing device 202. Furthermore, the application data 230 and/or any other data (e.g., device data 232) can be accessed by the automated assistant 204 to generate contextual data 236, which can characterize a context in which a particular application 234 and/or device is executing, and/or a context in which a particular user is accessing the computing device 202, accessing an application 234, and/or any other device or module.

While one or more applications 234 are executing at the computing device 202, the device data 232 can characterize a current operating state of each application 234 executing at the computing device 202. Furthermore, the application data 230 can characterize one or more features of an executing application 234, such as content of one or more graphical user interfaces being rendered at the direction of one or more applications 234. Alternatively, or additionally, the application data 230 can characterize an action schema, which can be updated by a respective application and/or by the automated assistant 204, based on a current operating status of the respective application. Alternatively, or additionally, one or more action schemas for one or more applications 234 can remain static, but can be accessed by the application state engine in order to determine a suitable action to initialize via the automated assistant 204.

The computing device 202 can further include an assistant invocation engine 222 that can use one or more trained machine learning models to process application data 230, device data 232, contextual data 236, and/or any other data that is accessible to the computing device 202. The assistant invocation engine 222 can process this data in order to determine whether or not to wait for a user to explicitly speak an invocation phrase to invoke the automated assistant 204, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant. When the one or more trained machine learning models are trained according to these instances of training data, the assistant invocation engine 222 can cause the automated assistant 204 to detect, or limit detecting, spoken invocation phrases from a user based on features of a context and/or an environment. Additionally, or alternatively, the assistant invocation engine 222 can cause the automated assistant 204 to detect, or limit detecting for one or more assistant commands from a user based on features of a context and/or an environment. In some implementations, the assistant invocation engine 222 can be disabled or limited based on the computing device 202 detecting an assistant suppressing output from another computing device. In this way, when the computing device 202 is detecting an assistant suppressing output, the automated assistant 204 will not be invoked based on contextual data 236—which would otherwise cause the automated assistant 204 to be invoked if the assistant suppressing output was not being detected.

In some implementations, the system 200 can include a radar engine 216 for interacting with a radar device that communicates with and/or is integral to the computing device 202. The radar engine 216 can process transmitted data and received data to determine differences between the data and identify features of an environment of the computing device 202. For example, and with prior permission from users, the radar engine 216 can determine whether a user is present in an environment of the computing device 202 and/or whether the user is present within a threshold distance of the computing device 202. When the user is determined to be within a threshold distance of the computing device 202 and/or another assistant-enabled device, the radar engine 216 can communicate with a segmentation engine 218 of the system 202.

The segmentation engine 218 can utilize information from the radar engine 216 to virtually segment portions of an environment of a user and/or the computing device 202. A segmented portion of the environment that is determined to include a user can be characterized by an entry that correlates the segmented portion of the environment to certain features of the automated assistant. In some implementations, multiple different segments can be identified as having users present in each respective segment, and each segment can be characterized by a respective entry that correlates a respective segment to certain features of the automated assistant. When the segmentation engine 218 has generated a respective entry for each environmental segment in which a user is determined to be present, the segmentation engine 218 can interact with a segment parameter engine 226 for generating parameters for each particular segment.

As an example, the segment parameter engine 226 can generate data that can characterize a confidence threshold for a particular segment of the environment in which a user has been detected. The confidence threshold can be biased from a default threshold value to favor positive detection of certain inputs such as hot words, warm words, gesture inputs, and/or any other inputs that can be detected by an automated assistant. Alternatively, or additionally, the segment parameter engine 226 can generate data for indicating certain features of the automated assistant that should be activated while a user is determined to be present in the environment and/or a particular segment of the environment. For example, the segment parameter engine 226 can generate data that indicates warm word detection for a closed set of words (e.g., words related to certain operations, such as controlling playback of music) should be activated when a user is determined to be located within a particular segment of the environment and/or while the automated assistant is performing a particular operation (e.g., playing music). This data can then be communicated to a detection feature engine 224, which can operate the automated assistant 204 according to the parameters characterized by the data.

For example, the detection feature engine 224 can cause warm word detection and/or hot word detection to be activated when a user is determined to be present within the environment, and a confidence threshold can be adjusted according to the particular segment of the environment that the user is located. Alternatively, or additionally, the detection feature engine 224 can cause the automated assistant 204 to enforce a less stringent confidence threshold for detecting certain warm words of a closed set of words (e.g., 10 words or less). In some implementations, an input can be assigned probabilities, and each probability can correspond to an estimate that the input embodies a particular warm word (e.g., "Stop," "Hang up," "Volume Up," etc.) and/or a particular hot word (e.g., "Assistant," "Ok, Assistant," "Hey, Assistant," etc.). The detection feature can control settings for thresholds that the probabilities can be compared to. For example, the detection feature engine 224 can enforce a less stringent threshold for a subset of warm words detected from a particular segment of the environment where a user was detected, and a more stringent threshold for that subset of warm words detected from another segment of the environment where a user was not detected (e.g., not detected for at least a threshold duration of time). In this way, false positives can be mitigated, and warm words can be more accurately responded to, in environments where automated assistants are enabled.

Figure 3:
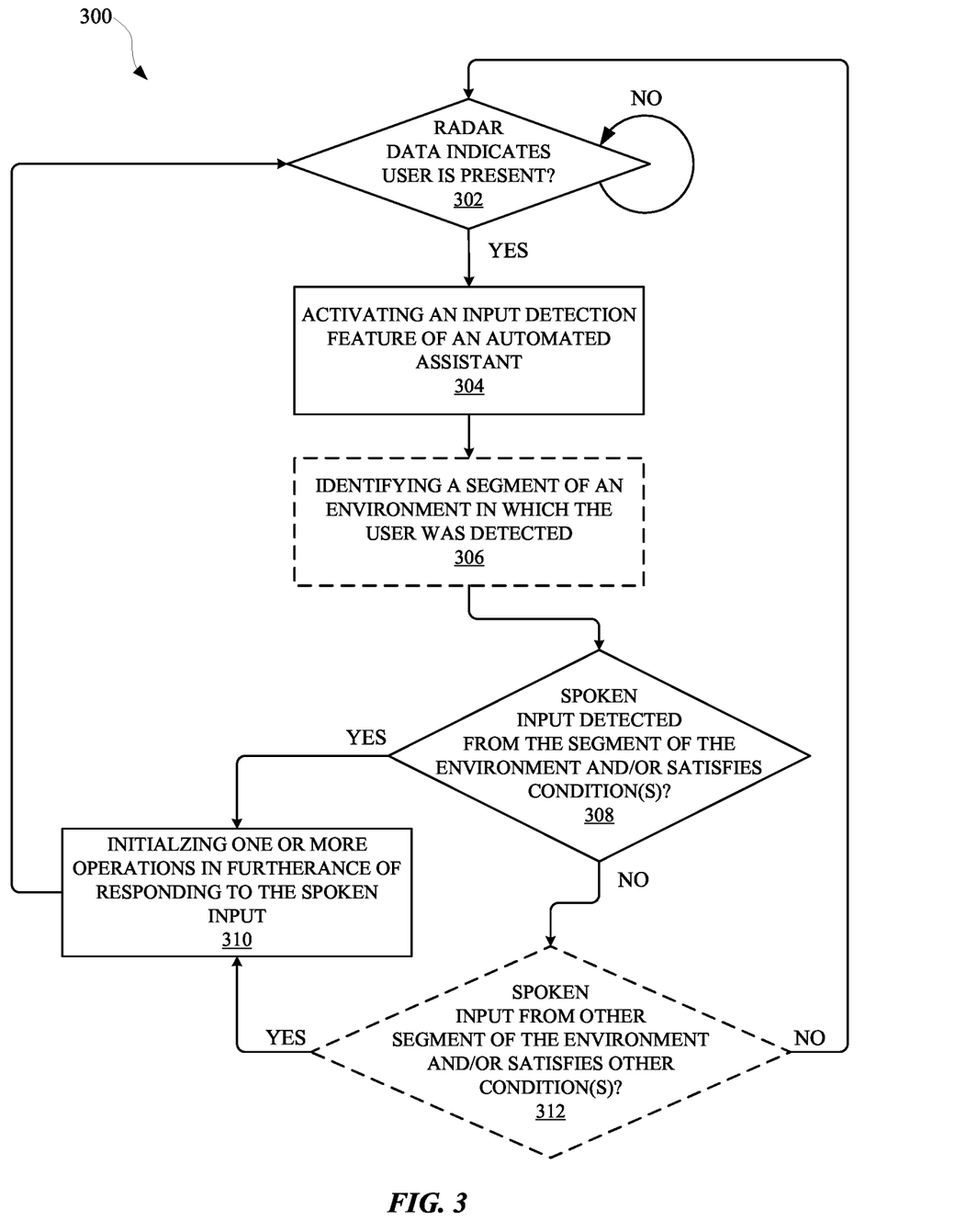
FIG. 3 illustrates a method for operating an automated assistant according to radar data that can be utilized to virtually segment portions of an environment for accurately detecting spoken utterances from portions of the environment.

FIG. 3 illustrates a method 300 for operating an automated assistant according to radar data that can be utilized to virtually segment portions of an environment for accurately detecting spoken utterances from portions of the environment. The method 300 can be performed by one or more computing devices, applications, and/or any other apparatus or module that can be associated with an automated assistant. The method 300 can include an operation 302 of determining whether radar data indicates that a user is present in an environment of a computing device that provides access to an automated assistant. The radar data can be generated by one or more radar devices that are in communication with the computing device. For example, the radar device can include one or more transmitters and/or one or more receivers that are in communication with the computing device and/or a separate computing device. In some implementations, the radar device can be a sonar device, a lidar device, and/or any other device that can generate radar-related data. Transmitted data provided by the radar device can be compared to received data that is received by the radar device to determine, with prior permission from the user, a location of the user within the environment.

When the user is determined to be within the environment, and/or within a threshold distance of the computing device, the method 300 can proceed from the operation 302 to an operation 304. The operation 304 can include activating an input detection feature (which may have not been immediately active) of an automated assistant in furtherance of allowing the automated assistant to be responsive to inputs from users. In some implementations, the input detection feature can be activated for a duration of time since the user was last determined to be within the environment. In some implementations, the input detection feature can include automatic speech recognition (ASR) processing, natural langue understanding (NLU) processing, and/or any other word detection model and/or operations for determining whether a user provided an input to the automated assistant. For example, an input detection feature of the automated assistant can include "hot word" detection (e.g., detecting a name for the assistant, such as "Ok, Assistant."), "warm word" detection (e.g., detecting a short request without a preceding hot word, such as "Pause."), and/or any other speech detection for determining whether the user has provided a request to the automated assistant.

When the input detection feature of the automated assistant is activated, the method 300 can proceed from the operation 304 to an optional operation 306 of identifying a segment of an environment in which the user was detected. In other words, the radar data can be utilized to determine a portion of the environment of the computing device that the user was detected in. For example, the environment of the computing device can include a circular area having a radius that can represent a threshold distance within which spoken utterances can be provided to, and responded to by, the automated assistant. A segment of this circular area, or other shape for an area, can include a span of angles (e.g., between 25 degrees and 45 degrees) that include the location of the user. When the segment of the environment that includes the user is identified, segment data can be generated for characterizing this segment, and one or more entries can be generated to correlate the segment to other assistant-related information (e.g., who is interacting with the automated assistant, subject matter of interactions originating from the segment, etc.).

The method 300 can proceed from the operation 304, and/or the optional operation 306, to an operation 308, which can include determining whether a spoken input has been detected from the segment of the environment and/or satisfies one or more conditions. The one or more conditions can include, for example, a probability threshold that can be satisfied by a probability metric generated for a particular spoken input. When the automated assistant receives a spoken utterance (e.g., a warm word), the automated assistant can generate a probability metric (e.g., a confidence metric) that characterizes a degree of confidence that the spoken utterance embodies a particular request (e.g., "Pause" playback of music), that the spoken utterance embodies natural language related to particular subject matter (e.g., the spoken utterance relates to food recipes), and/or any other condition associated with assistant interactions. In some implementations, conditions can be different for different segments of the environment. For example, because the user was detected within the segment using the radar data, the probability threshold (i.e., confidence threshold) for that segment can be lower (e.g., be less stringent) than another probability threshold (i.e., confidence threshold) for another segment of the environment in which a user has not been detected. Alternatively, processing of audio determined to have originated from a segment of the environment in which a user has not been detected can be bypassed. In this way, less false positives can occur during interactions between the user and the automated assistant, and less computational resources can be wasted.

When a spoken input has originated from the segment of the environment and/or one or more conditions are satisfied, the method 300 can proceed from the operation 308 to an operation 310. The operation 310 can include initializing one or more operations in furtherance of responding to the spoken input. For example, when the user provides a "hot word" such as, "Ok, Assistant," the automated assistant can initialize an operation to activate another audio processing model (e.g., a word detection model, automated speech recognition, NLU and/or ASR for request fulfillment) and/or modify a setting of an input detection feature for determining how to respond to a forthcoming spoken utterance from the user. Thereafter, the method 300 can return to the operation 302 for determining, with prior permission from the user, whether the user remains in the segment of the environment. Otherwise, when the spoken input is not detected from the segment, the method 300 can proceed from the operation 308 to an optional operation 312.

The optional operation 312 can include determining whether a spoken input from another segment of the environment is detected and/or satisfies one or more other conditions. When a spoken input is detected from another segment of the environment, such as a segment that a user has not been detected in, a determination can be made regarding whether one or more other conditions are satisfied for responding to the spoken input. For example, other segments in which a user has not been detected can be associated with an additional confidence threshold that is greater (e.g., more stringent) than the confidence threshold for a segment in which the user is being detected. Alternatively, other segments in which a user has not been detected can be treated as areas in which one or more input detections features should not be active. In some implementations, detecting the user is in a particular segment can be accomplished by concentrating detection of signals (e.g., radio frequency signals), filtering certain signals, and/or using one or more other data processing techniques. For example, beam forming can be utilized as a technique for detecting a spoken utterance from a particular segment of an environment. Alternatively, or additionally, processing audio data captured by an array of two or more microphones can be utilized and/or filtered to determine a particular direction from which the spoken utterance originated. When a confidence metric generated for the spoken input is determined to satisfy the confident threshold for the other segment, and/or any other conditions are satisfied for the other segment, the method 300 can proceed from the operation 312 to the operation 310. Otherwise, when the conditions are not satisfied, the method 300 can return to the operation 302 for determining whether the user is still present in a segment of the environment.

Figure 4:
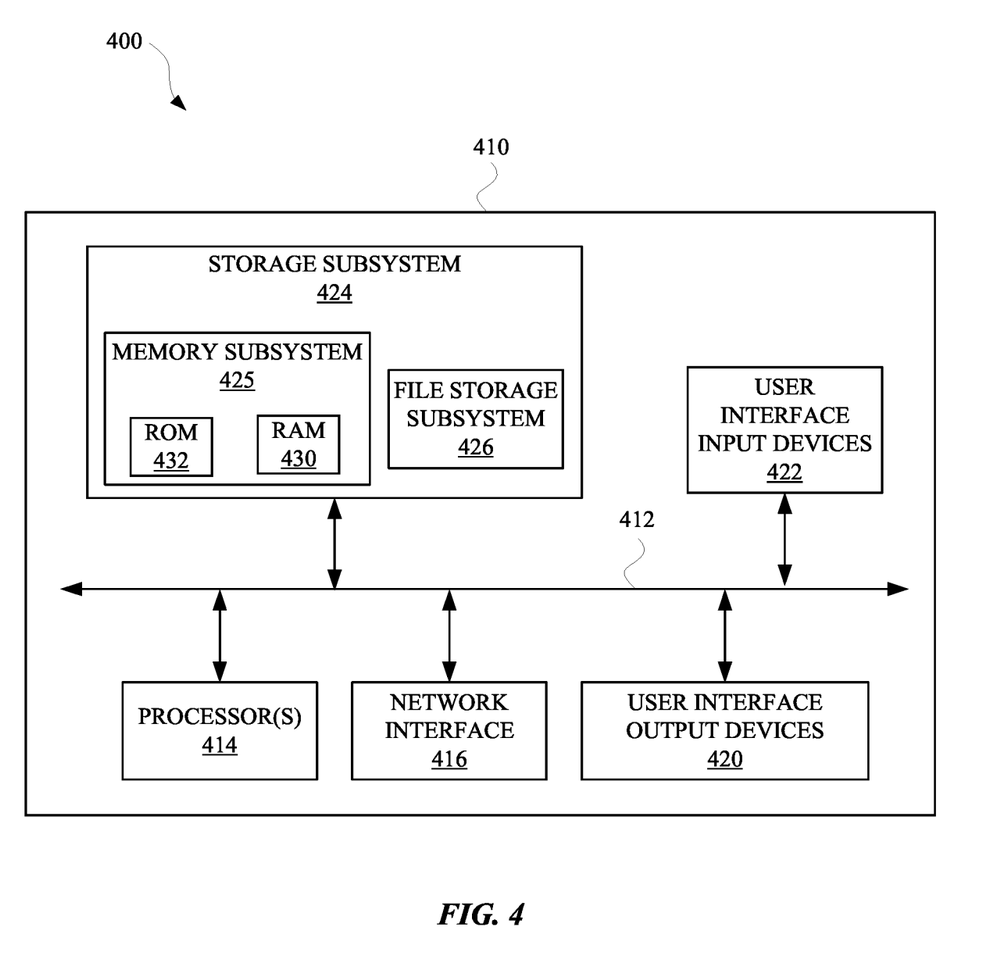
FIG. 4 is a block diagram of an example computer system

FIG. 4 is a block diagram 400 of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of system 200, automated assistant, and/or any other application, device, apparatus, and/or module discussed herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as processing, while an input detection feature of an automated assistant is inactive, radar data generated by a radar device of a computing device that provides access to the automated assistant. The automated assistant is responsive to natural language inputs from a user when the input detection feature of the automated assistant is active. The method can further include determining, based on the radar data, whether to activate the input detection feature of the automated assistant, where the input detection feature of the computing device is activated in response to the radar data indicating that the user is within a threshold distance of the computing device. The method can further include when the input detection feature is activated based on the radar data: determining, using the input detection feature and input data accessible to the automated assistant, whether the user has provided a spoken utterance to the automated assistant, and causing, in response to the user providing the spoken utterance to the automated assistant, the automated assistant to initialize performance of one or more operations based on the spoken utterance. The method can further include when the input detection feature is not activated based on the radar data: causing the input detection feature to remain inactive until additional radar data indicates that one or more users are present within the threshold distance of the computing device.

In some implementations, processing the radar data includes: determining differences between transmitted data provided by the radar device to an environment of the computing device, and received data received by the radar device from the environment of the computing device, where the transmitted data is embodied in one or more radio frequencies. In some implementations, processing the radar data further includes: determining, based on the differences between the transmitted data and the received data, a segmented portion of the environment from which the spoken utterance was received. In some implementations, determining whether the user has provided the spoken utterance to the automated assistant includes determining whether the spoken utterance originated from the segmented portion of the environment. In some implementations, determining whether the user has provided the spoken utterance to the automated assistant includes determining whether the spoken utterance was detected, by the automated assistant, with a threshold degree of confidence. Optionally, the threshold degree of confidence is selected, based on the radar data, for the segmented portion of the environment from which the spoken utterance originated.

In some implementations, a different threshold degree of confidence is selected, based on the radar data, for a different segmented portion of the environment from which the spoken utterance did not originate. In some implementations, determining whether the user has provided the spoken utterance to the automated assistant includes causing audio data to be processed using a word detection model to generate output that indicates whether one or more words of a closed set of words, for which the word detection model is trained, is characterized by the additional audio data. In some implementations, the output is a probability metric that is compared to a probability threshold for each respective word of the one or more words for determining whether the user provided the spoken utterance.

In other implementations, a method implemented by one or more processors is set forth as including operations such as processing audio data received by a computing device that provides access to an automated assistant, where the audio data is processed in furtherance of determining whether a user provided an invocation phrase to the automated assistant. In some implementations, the method can further include causing, in response to receiving the audio data, a radar device of the computing device to provide a transmission to an environment of the computing device. The transmission is provided in furtherance of determining whether the user is present in the environment. In some implementations, the method can further include processing radar data that indicates one or more differences between the transmission provided to the environment and a reflected transmission that is generated in response to the transmission being provided to the environment, where the one or more differences indicate whether the user is present in the environment. In some implementations, the method can further include determining, based on the radar data and the audio data, whether to modify a setting of an input detection feature of the automated assistant. The setting controls a confidence threshold for responding to one or more subsequent spoken utterances received from the user within a duration of time of the automated assistant receiving the invocation phrase from the user. In some implementations, the method can further include, when the setting of the input detection feature of the automated assistant is modified based on the radar data and the audio data: causing additional audio data to be processed, according to the setting, in furtherance of determining whether the user provided a subsequent spoken utterance that embodies a request for the automated assistant.

In some implementations, the method can further include determining, based on processing the radar data, a segmented portion of the environment from which to detect the one or more subsequent spoken utterances from the user. In some of those implementations, the setting controls the confidence threshold for responding to one or more subsequent spoken utterances that originated from the segmented portion of the environment, and causing the additional audio data to be processed in furtherance of determining whether the user provided the subsequent spoken utterance includes determining whether the spoken utterance originated from the segmented portion of the environment. In some implementations, the method can further include, when the setting of the input detection feature of the automated assistant is modified based on the radar data and the audio data: generating, based on the segmented portion of the environment, an entry that is stored in association with the automated assistant and correlates the user with the segmented portion of the environment.

In some implementations, the method can further include, when the setting of the input detection feature of the automated assistant is modified based on the radar data and the audio data: generating, based on the segmented portion of the environment, an entry that is stored in association with the automated assistant and correlates the request with the segmented portion of the environment. In some implementations, causing the additional audio data to be processed includes causing the additional audio data to be processed using a word detection model to generate output that indicates whether one or more words of a closed set of words, for which the word detection model is trained, is characterized by the additional audio data. In some implementations, the output is a probability metric that is compared to a probability threshold for each respective word of the one or more words for determining whether the user provided the spoken utterance, and the spoken utterance is determined to be provided by the user when the probability metric satisfies the probability threshold for a particular word of the one or more words.

In yet other implementations, a method implemented by one or more processors is set forth as including operations such as processing, while an input detection feature of an automated assistant is inactive, radar data generated by a radar device of a computing device that provides access to the automated assistant. The automated assistant is responsive to natural language inputs from a user when the input detection feature of the automated assistant is active. The method can further include causing, based on the radar data, the input detection feature of the automated assistant to be active when the radar data indicates that the user is present in an environment of the computing device. The method can further include determining, based on the radar data indicating that the user is present in the environment, a particular segment of the environment in which the user is located. The particular segment of the environment includes an area that is less than an entire area of the environment. The method can further include causing, when the user is determined to be located in the particular segment of the environment, a setting for the input detection feature to be selected for controlling a responsiveness of the automated assistant to audio originating from the particular segment of the environment.

In some implementations, the method can further include, when the setting of the input detection feature of the automated assistant is selected for the particular segment of the environment: causing input data to be processed, according to the setting, in furtherance of determining whether the user provided an assistant input from the particular segment of the environment. In some implementations, the input detection feature includes a word detection model, and causing the input data to be processed includes: causing audio data to be processed using the word detection model to generate output that indicates whether one or more words of a closed set of words, for which the word detection model is trained, is characterized by the audio data. In some implementations, the output is a probability metric that is compared to a probability threshold for each respective word of the one or more words for determining whether the user provided the spoken utterance, and the spoken utterance is determined to be provided by the user when the probability metric satisfies the probability threshold for a particular word of the one or more words. In some implementations, the input detection feature includes a word detection model, and causing the input data to be processed includes: causing audio data to be processed using the word detection model to generate output that indicates whether the audio data embodies natural language associated with particular subject matter of one or more previous inputs that originated from the particular segment of the environment. In some implementations, causing the setting for the input detection feature to be selected for controlling the responsiveness of the automated assistant to the audio originating from the particular segment of the environment includes: causing a confidence threshold to be selected, wherein the output is compared to the confidence threshold for determining whether the audio data embodies the natural language associated with the particular subject matter.

We claim:

1. A method implemented by one or more processors, the method comprising:
   processing audio data received by a computing device that provides access to an automated assistant,
      wherein the audio data is processed in furtherance of determining whether a user provided an invocation phrase to the automated assistant;
   causing, in response to receiving the audio data, a radar device of the computing device to provide a transmission to an environment of the computing device,
      wherein the transmission is provided in furtherance of determining whether the user is present in the environment;
   processing radar data that indicates one or more differences between the transmission provided to the environment and reflected data that is generated in response to the transmission being provided to the environment,
      wherein the one or more differences indicate whether the user is present in the environment;
   determining, based on the radar data and the audio data, whether to modify a setting of an input detection feature of the automated assistant,
      wherein the setting controls a confidence threshold for responding to one or more subsequent spoken utterances received from the user within a duration of time of the automated assistant receiving the invocation phrase from the user; and
   when the setting of the input detection feature of the automated assistant is modified based on the radar data and the audio data:
      causing additional audio data to be processed, according to the setting, in furtherance of determining whether the user provided a subsequent spoken utterance that embodies a request for the automated assistant.

2. The method of claim 1, further comprising:
   determining, based on processing the radar data, a segmented portion of the environment from which to detect the one or more subsequent spoken utterances from the user,
      wherein the setting controls the confidence threshold for responding to one or more subsequent spoken utterances that originated from the segmented portion of the environment, and
      wherein causing the additional audio data to be processed in furtherance of determining whether the user provided the subsequent spoken utterance includes determining whether the spoken utterance originated from the segmented portion of the environment.

3. The method of claim 2, further comprising:
   when the setting of the input detection feature of the automated assistant is modified based on the radar data and the audio data:
      generating, based on the segmented portion of the environment, an entry that is stored in association with the automated assistant and correlates the user with the segmented portion of the environment.

4. The method of claim 2, further comprising:
   when the setting of the input detection feature of the automated assistant is modified based on the radar data and the audio data:
      generating, based on the segmented portion of the environment, an entry that is stored in association with the automated assistant and correlates the request with the segmented portion of the environment.

5. The method of claim 1, wherein causing the additional audio data to be processed includes causing the additional audio data to be processed using a word detection model to generate output that indicates whether one or more words of a closed set of words, for which the word detection model is trained, is characterized by the additional audio data.

6. The method of claim 5,
   wherein the output is a probability metric that is compared to a probability threshold for each respective word of the one or more words for determining whether the user provided the spoken utterance, and
   wherein the spoken utterance is determined to be provided by the user when the probability metric satisfies the probability threshold for a particular word of the one or more words.

7. A method implemented by one or more processors, the method comprising:
   processing, while an input detection feature of an automated assistant is inactive, radar data generated by a radar device of a computing device that provides access to the automated assistant,
      wherein the automated assistant is responsive to natural language inputs from a user when the input detection feature of the automated assistant is active, and
      wherein the input detection feature includes a word detection model;
   causing, based on the radar data, the input detection feature of the automated assistant to be active when the radar data indicates that the user is present in an environment of the computing device;
   determining, based on the radar data indicating that the user is present in the environment, a particular segment of the environment in which the user is located,
      wherein the particular segment of the environment includes an area that is less than an entire area of the environment; and
   causing, when the user is determined to be located in the particular segment of the environment, a setting for the input detection feature to be selected for controlling a responsiveness of the automated assistant to audio originating from the particular segment of the environment;
   when the setting of the input detection feature of the automated assistant is selected for the particular segment of the environment:
      causing input data to be processed, according to the setting, in furtherance of determining whether the user provided an assistant input from the particular segment of the environment, wherein causing the input data to be processed includes:
         causing audio data to be processed using the word detection model to generate output that indicates whether one or more words of a closed set of words, for which the word detection model is trained, is characterized by the audio data,
            wherein the output is a probability metric that is compared to a probability threshold for each respective word of the one or more words for determining whether the user provided a spoken utterance, and
            wherein the spoken utterance is determined to be provided by the user when the probability metric satisfies the probability threshold for a particular word of the one or more words.

8. A computing device that provides access to an automated assistant, the computing device comprising:
a radar device;
memory storing instructions; and
one or more processors operable to execute the instructions to:
process audio data received by the computing device, wherein the audio data is processed in furtherance of determining whether a user provided an invocation phrase to the automated assistant;
cause, in response to receiving the audio data, the radar device to provide a transmission to an environment of the computing device,
wherein the transmission is provided in furtherance of determining whether the user is present in the environment;
process radar data that indicates one or more differences between the transmission provided to the environment and reflected data that is generated in response to the transmission being provided to the environment,
wherein the one or more differences indicate whether the user is present in the environment;
determine, based on the radar data and the audio data, whether to modify a setting of an input detection feature of the automated assistant,
wherein the setting controls a confidence threshold for responding to one or more subsequent spoken utterances received from the user within a duration of time of the automated assistant receiving the invocation phrase from the user; and
when the setting of the input detection feature of the automated assistant is modified based on the radar data and the audio data:
cause additional audio data to be processed, according to the setting, in furtherance of determining whether the user provided a subsequent spoken utterance that embodies a request for the automated assistant.

9. The computing device of claim 8, wherein one or more of the processors are further operable to execute the instructions to:
determine, based on processing the radar data, a segmented portion of the environment from which to detect the one or more subsequent spoken utterances from the user,
wherein the setting controls the confidence threshold for responding to one or more subsequent spoken utterances that originated from the segmented portion of the environment, and
wherein causing the additional audio data to be processed in furtherance of determining whether the user provided the subsequent spoken utterance includes determining whether the spoken utterance originated from the segmented portion of the environment.

10. The computing device of claim 9, wherein one or more of the processors are further operable to execute the instructions to:
when the setting of the input detection feature of the automated assistant is modified based on the radar data and the audio data:
generate, based on the segmented portion of the environment, an entry that is stored in association with the automated assistant and correlates the user with the segmented portion of the environment.

11. The computing device of claim 9, wherein one or more of the processors are further operable to execute the instructions to:
when the setting of the input detection feature of the automated assistant is modified based on the radar data and the audio data:
generate, based on the segmented portion of the environment, an entry that is stored in association with the automated assistant and correlates the request with the segmented portion of the environment.

12. The computing device of claim 8, wherein causing the additional audio data to be processed includes causing the additional audio data to be processed using a word detection model to generate output that indicates whether one or more words of a closed set of words, for which the word detection model is trained, is characterized by the additional audio data.

13. The computing device of claim 12,
wherein the output is a probability metric that is compared to a probability threshold for each respective word of the one or more words for determining whether the user provided the spoken utterance, and
wherein the spoken utterance is determined to be provided by the user when the probability metric satisfies the probability threshold for a particular word of the one or more words.

* * * * *